United States Patent [19]

Neary

[11] 3,726,599
[45] Apr. 10, 1973

[54] SAMPLE CELL FOR LIQUID SCINTILLATION COUNTERS

[75] Inventor: Michael P. Neary, Newport Beach, Calif.

[73] Assignee: Beckman Instruments, Inc., Fullerton, Calif.

[22] Filed: Nov. 27, 1970

[21] Appl. No.: 93,254

[52] U.S. Cl.............356/246, 23/254 R, 195/127, 250/71.5 R, 250/106 SC
[51] Int. Cl..............................G01n 1/10
[58] Field of Search.............250/106 SC, 83.6 FT, 250/83 CD, 71.5 R, 71 R, 43.5 R, 43.5 MR; 195/103.5 R, 127; 23/254 R; 356/246

[56] References Cited

UNITED STATES PATENTS

| | | | |
|---|---|---|---|
| 3,520,660 | 7/1970 | Webb | 195/103.5 R |
| 3,437,812 | 4/1969 | Packard | 250/106 SC |
| 3,359,973 | 12/1967 | Hoffman | 195/103.5 R |

Primary Examiner—James W. Lawrence
Assistant Examiner—Davis L. Willis
Attorney—Paul R. Harder and Robert J. Steinmeyer

[57] ABSTRACT

A sample cell is disclosed for adapting liquid scintillation counters to chemiluminescence measurements. A glass reaction vessel is secured within a support tube of substantially the same size and shape as the elevator passageway of a liquid scintillation counter. An O-ring seals the passageway against ambient light when the reaction vessel is in the counting position. A plurality of glass tubes are sealed within the vessel and are brought through the top of the support tube by black polyethylene tubing, the black polyethylene preventing light piping from the exterior to within the reaction vessel. Two of the glass tubes are open and terminate near the bottom of the vessel to fill and empty the vessel. A third is sealed at its lower end and receives a thermistor to measure sample temperature. Two other tubes are interconnected by a tubular helix for circulation of a thermostating fluid. The vessel may be sandblasted and the bottom silvered or aluminized to improve optical transmission characteristics. The bottom is covered with felt to absorb mechanical shock.

10 Claims, 1 Drawing Figure

PATENTED APR 10 1973　　　　　　　　　　　　　　　3,726,599
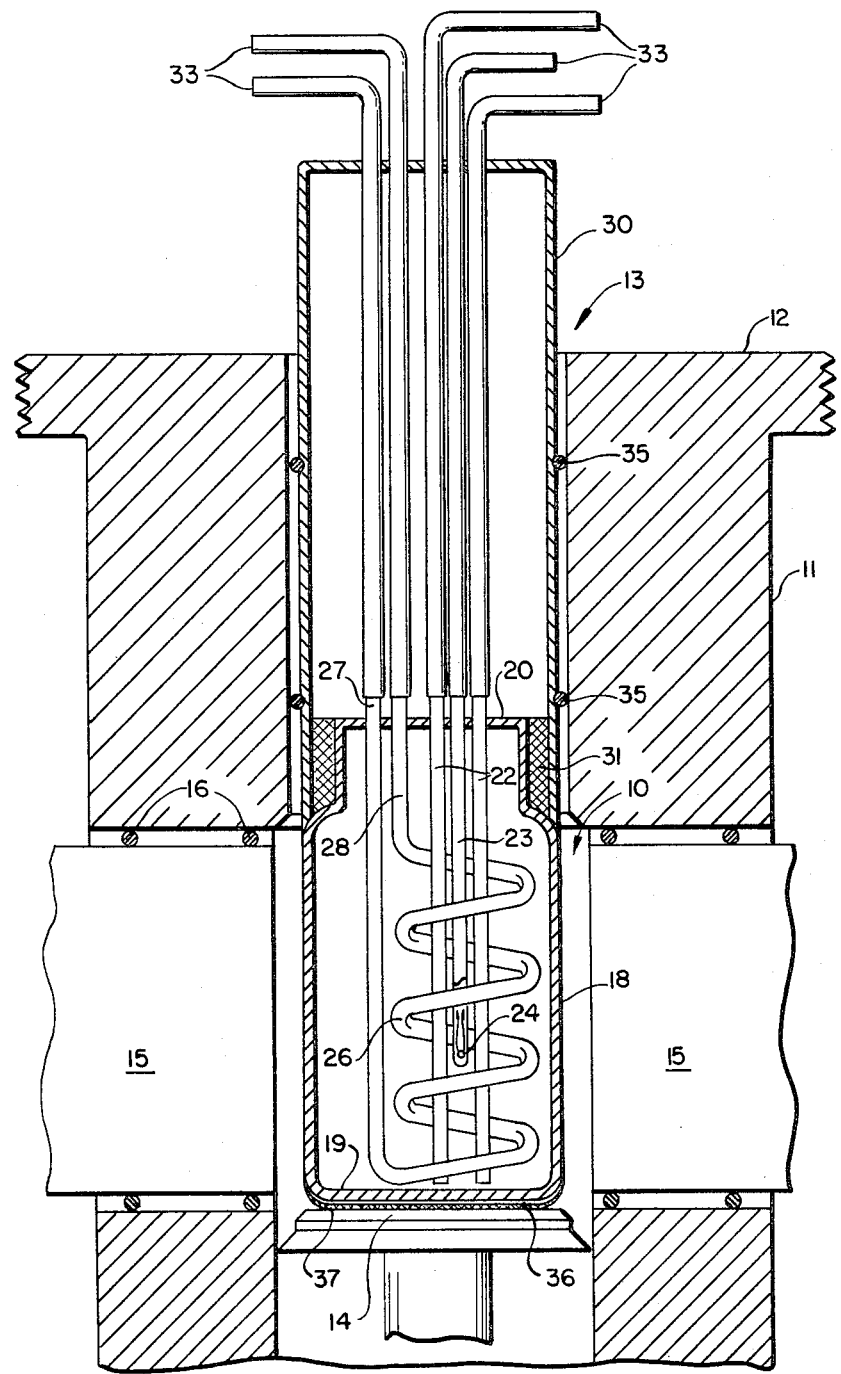
INVENTOR.
MICHAEL P. NEARY
BY
Paul R. Harder
ATTORNEY

SAMPLE CELL FOR LIQUID SCINTILLATION COUNTERS

This invention relates generally to the field of chemiluminescence measurements and more particularly to an in situ sample cell for use in liquid scintillation counters to adapt the counter for chemiluminescent measurements.

Certain chemical reactions result in the production of molecules in an excited electronic state and as these molecules dissipate energy in returning to the ground state photons or small flashes of light are emitted. Certain other chemical reactions, while not chemiluminescent in and of themselves, are capable of transferring energy to an emitter or fluorescer which, upon receipt of the energy from the reaction, produces photons. By counting these photons or light flashes, usually as a function of time, various quantitative and qualitative determinations concerning the reaction may be made.

Liquid scintillation counters have been employed to count the photons of light emitted by a scintillator or fluor which is the result of excitation of the scintillator by radioactive particles. Most modern liquid scintillation counters utilize a pair of diametrically opposed photomultiplier tubes facing onto a light tight counting chamber. Although capable of counting the photons emitted from chemiluminescent reactions these modern liquid scintillation counters do not provide a convenient means for such counting since it is the general practice to mix the scintillator with the radioactive material outside the counting chamber, place the sample in a vial and lower the vial into the counting chamber by an elevator through a double light tight sealing mechanism arranged such that the counting chamber at all times is sealed against ambient light. This mechanism is not ideally suited to the measurement of chemiluminescent reactions since it is generally desired to register the photon emission data from time zero when the reactants are mixed to completion or for some predetermined period of time. The time taken to lower the mixed reactants from outside the counting chamber through the double light seal and into the counting chamber results in loss of significant photoemission data.

In my copending application Ser. No. 93,253 entitled "Demountable Sample Cell Holder and Cell for Liquid Scintillation Counters," filed on even date herewith and assigned to the assignee of the instant invention, there is disclosed a sample cell holder for adapting liquid scintillation counters for chemiluminescent measurements. This sample holder and cell allows the in situ mixing of the reactants within the counting chamber such that the photons may be counted from time zero. The sample cell holder and cell disclosed in the referenced application is mounted within one of the photomultiplier apertures in the counting chamber. This requires the researcher to remove one of the photomultiplier tubes and substitute the cell holder disclosed therein. While there are advantages to the cell holder and cell disclosed in the aforementioned application as well as in the measurement technique utilizing only a single photomultiplier tube, under some circumstances the researcher may desire to utilize both photomultiplier tubes, which in most modern instruments allows coincidence gating, or may not desire to modify the liquid scintillation counter to the extent necessary to utilize the cell holder and cell disclosed in the aforementioned application.

It is, therefore, the principal object of this invention to provide a sample cell for liquid scintillation counters to adapt these counters to the measurement of chemiluminescent reactions and which does not require the modification of the liquid scintillation counter.

Another object of the present invention is to provide a sample cell for liquid scintillation counters which allows in situ mixing of the reactants from which the photons are derived within the counting chamber thus allowing measurement of the photoemission data from the time the reactants are mixed.

Other objects and many of the attendant advantages of this invention will become more readily apparent as the same becomes better understood by reference to the following detailed description when read in connection with the accompanying drawing and in which:

The single FIGURE is a partial cross-sectional view of a modern liquid scintillation counter with a sample cell constructed in accordance with the teachings of this invention in the counting position.

Referring now to the drawing there is illustrated a partial sectional view of the counting chamber 10 which is typically formed within a heavy casting 11 of any suitable material such as brass. Access to the counting chamber from the outer surface 12 of the counter is normally through an elevator passageway 13. Also illustrated schematically is the sample vial elevator 14 in the counting position, it being understood that the elevator passageway has a light sealing shutter at the top thereof (not shown) and the elevator being arranged such that as it rises, a light seal is made at the junction of the elevator passageway and the counting chamber or within the elevator passageway prior to opening of the outer light sealing shutter so that the chamber 10 is at all times sealed against ambient light. Since the elevator is maintained in its counting position and the outer shutter is opened at all times while utilizing the invention, the elevator, its light sealing mechanism and the shutter have not been shown in detail and form no part of this invention.

In most modern liquid scintillation counters a pair of photomultiplier tubes 15 are arranged about the counting chamber in diametrically opposed positions and are retained within the apertures in casting 11 by pairs of O-rings 16 which seal the counting chamber against ambient light.

In order to adapt the liquid scintillation counter to photon counting and to commence the counting at time zero when the reactants are mixed it is necessary to provide a sample cell capable of in situ mixing of the reactants. For this purpose there is provided a sample cell or reaction vessel 18 formed of any suitable light transmitting material such as glass or quartz. The sample cell 18 has a bottom portion 19 and a top portion 20, it being preferred to integrally form the top and bottom portions with the side walls. Sealed within the top portion 20 of the sample cell 18 are a pair of conduits 22 which extend from outside the reaction vessel to just above the bottom portion 19, it being preferred to terminate these conduits as close to the bottom wall as possible without unduly restricting the flow of fluid therethrough. A third tube 23 also extends from the upper outer portion of the vessel to approximately two-thirds the distance toward the bottom of the vessel and is closed at its lower end. A thermistor 24 may be contained within the tube 23 to measure the temperature of the reactants if desired.

In certain reactions it may be desirable to control the temperature of the reactants or to program their temperature as a function of time. For this purpose there may be, if desired, provided within the reaction vessel a tubular helix 26 having an inlet and outlet conduit 27 and 28 extending beyond and fused into the top portion 20 of the sample cell 18.

The reaction vessel or sample cell 18 is secured to a support tube 30 by an epoxy resin collar 31, the diameter of the reaction vessel being reduced slightly in size near its upper end to fit within the support tube 30 and to provide space therebetween for the epoxy resin collar. Of course, any other suitable material may be utilized to secure the support tube 30 and the reaction vessel 18. The support tube is preferably of rigid material such as aluminum, is closed at its upper end and has a plurality of apertures in the upper end thereof for the purpose of bringing the connecting tubes 33 to the exterior of the assembly. The connecting tubes 33 connect to respective ones of the tubing or conduits within the reaction vessel and is preferably of black polyethylene, bent at a right angle at the exterior to prevent any light piping from outside the instrument. The tubing connected to tube 23 allows the lead wires of thermistor 24 to be brought to the exterior of the cell assembly, the tubing connected to conduits 22 allow introduction and removal of the reactants to the cell and the tubing connected to conduits 27 and 28 allows circulation of a thermostatting fluid within the glass helix. The junction of the tubing 33 and the support tube 30 where the tubing 33 passes through the apertures is sealed against the passage of ambient light. Black rubber grommets such as neoprene have been found suitable for constructing this seal.

A pair of annular grooves are preferably provided in the exterior of support tube 30 for receiving a pair of O-rings 35. The support tube is of substantially the same size and shape as the elevator passageway and as the reaction vessel is introduced into the passageway, O-rings 35 mate with the elevator passageway to seal the passageway against ambient light.

As is well known, most modern liquid scintillation instruments have a light sealing shutter at the outer surface which cooperates with the seal associated with the elevator shaft such that the counting chamber 10 is at all times sealed against ambient light. By placing the lower O-ring 35 at a position closely adjacent the lower end of support tube 30 it is possible to raise the elevator just sufficiently to seal the lower end of the elevator passageway at the entrance into the counting chamber, open the light sealing shutter at the top and insert the sample cell assembly into the elevator passageway until the lower O-ring seals the upper portion of the passageway against ambient light. The elevator can then be lowered to the counting position and the sample cell assembly pushed down the elevator passageway until the reaction vessel 18 is in the counting position. In this manner the high voltage to the photomultiplier tubes need not be removed during insertion and removal of the sample cell.

Returning again to the reaction vessel or sample cell 18 the outer surface of the bottom wall portion 19 is provided with a silvered or aluminized coating 36 to enhance transmission. If desired the bottom may also be covered with felt 37 to provide mechanical protection. If desired, the exterior of the sample cell may be sandblasted to improve its light transmission characteristics.

In operation, after positioning the sample cell assembly in the counting position one of the reactants is added to the reaction vessel through one of the inlet tubes. The other reactant is then added, it being generally preferable to add the second reactant through the other tube to avoid contact with the residue of the other prior to entry into the reaction vessel. If the temperature of the reactants is to be measured a thermistor is slipped into the central tube 23 prior to introducing the reactants. If the reaction is to be thermostatted, a thermostatting fluid is circulated through the helix 26 via the inlet and outlet conduits 27 and 28. After the measurement, the reactants are pumped from the cell by any suitable means, the cell being then washed with any suitable material which will not contaminate or inhibit the subsequent reaction to be measured. The inlet and outlet conduits are brought as closely to the bottom of the reaction vessel as possible without substantially inhibiting the flow of fluid therethrough. All of the tubes and conduits within the reaction vessel, are constructed of material which permit good transmission of photons and are generally preferably constructed of glass or quartz.

The geometry of the reaction vessel may, of course, be changed as well as the geometry of the support tube to fit the particular instrument being utilized although most modern instruments utilize a circular elevator passageway. The sample cell assembly disclosed provides for the measurement of chemiluminescent reactions with greater reproducibility and ease owing generally to the in situ nature of the sample mixing. The data thus obtained will be of inherently better quality than has been heretofore possible since measurements can take place immediately upon mixture of the reactants.

Although the sample cell assembly has been described in connection with the preferred embodiment it is obvious that other embodiments and arrangements of parts are possible without departing from the invention as defined by the appended claims.

What is claimed is:

1. A sample cell for use in a liquid scintillation counter having a light tight counting chamber and an elevator passageway extending from the exterior of said counter into said chamber comprising:

a cell body of material transparent to photons;

a plurality of tubes extending from outside said cell body into the interior thereof, at least one of said tubes being open at each end thereof to allow sample fluid to pass therethrough;

a support tube secured to one end of said cell body, said support tube being of substantially the same size and shape as said elevator passageway and of sufficient length to extend beyond said passageway when said cell body is within said counting chamber; and means on said support tube for cooperating with said passageway for sealing said counting chamber against ambient light when said cell body is in said counting chamber.

2. The sample cell according to claim 1 wherein each of said plurality of tubes extend through that portion of said support means extending beyond said passageway, at least that portion of said tubes extending through said support tube being of black inert material.

3. The sample cell according to claim 2 wherein one of said plurality of tubes is closed at the end within said cell body.

4. The sample cell according to claim 3 wherein two of said tubes are open at each end thereof to allow sample fluid flow therethrough, each of said open tubes extending substantially to the bottom of said cell body.

5. The sample cell according to claim 4 further including tube means within said cell body interconnecting a pair of said plurality of tubes for circulating a thermostatting fluid therethrough.

6. A sample cell for use in a liquid scintillation counter having a light tight counting chamber and an elevator passageway extending from the exterior of said counter into said chamber comprising:
   a glass reaction cell;
   a plurality of glass tubes sealed in one end of said cell, at least a pair of said tubes being opened at both ends and extending substantially to the other end of said cell;
   a support tube secured to said one end of said cell, said support tube being completely closed and of substantially the same size, and shape as said elevator passageway, said support tube being longer than said elevator passageway and extended therefrom when said cell is in the counting chamber;
   at least one O-ring on the outer surface of said support tube, said O-ring fitting against the wall of said passageway to seal said passageway against ambient light when said cell is in the counting chamber;
   black inert tubing means connected to each of said glass tubes and extending through the portion of said support tube extending beyond said passageway.

7. The sample cell according to claim 6 wherein one of said glass tubes is sealed at its end within said cell; and
   a thermistor is said last named tube for measuring the temperature of sample in said cell.

8. The sample cell according to claim 7 wherein the outer surface of the other end of said cell is coated with a reflective material; and
   a shock resistant material secured over said coating.

9. The sample cell according to claim 7 wherein the outer surface of said cell has been sandblasted.

10. The sample cell according to claim 9 further including:
    glass tubing means in the form of a helix within said cell and interconnecting two of said glass tubes for circulating a thermostatting fluid therethrough.

* * * * *